I. A. Sergeant,
Wringer,
Reissued June 18, 1867.
No. 2,652.
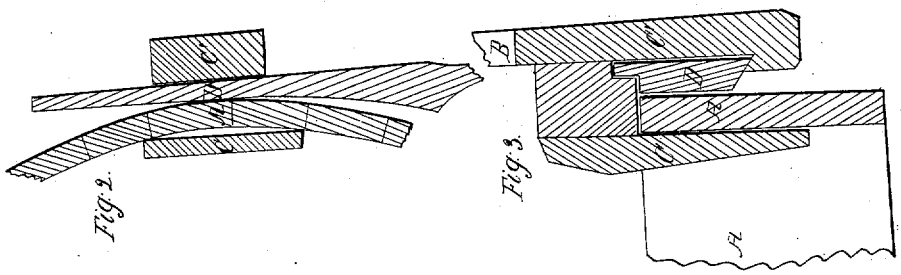
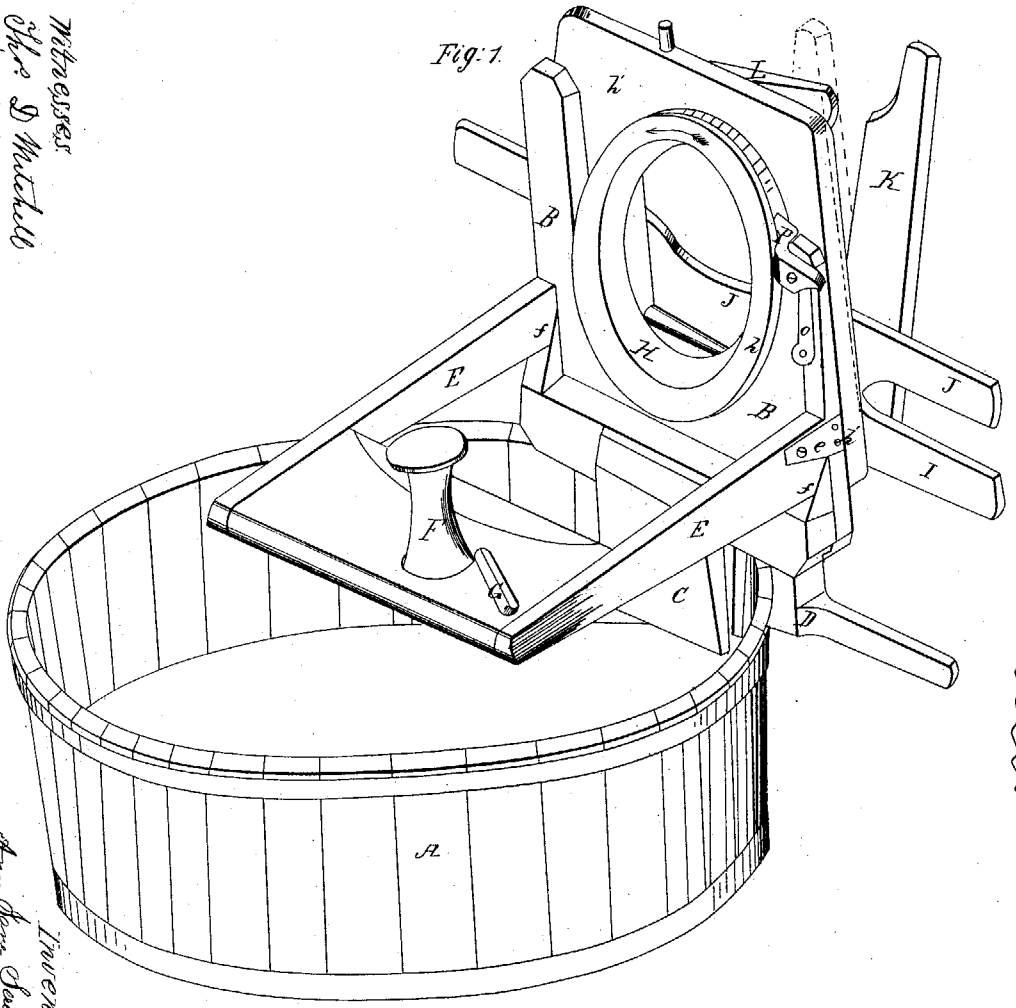
Witnesses.
Thos. D. Mitchell
J. A. Casey
Inventor.
Ann Jane Sergeant
N. PETERS, PHOTO-LITHOGRAPHER, WASHINGTON, D. C.

United States Patent Office.

ANN JANE SERGEANT, OF DAYTON, OHIO, ADMINISTRATRIX OF THE ESTATE OF ISAAC A. SERGEANT, DECEASED, ASSIGNOR TO SYLVENUS WALKER, OF NEWARK, NEW JERSEY.

*Letters Patent No.* 21,029, *dated July* 27, 1858; *reissue No.* 2,652, *dated June* 18, 1867.

DIVISION 1.

IMPROVED CLOTHES-WRINGER.

The Schedule referred to in these Letters Patent and making part of the same.

TO ALL WHOM IT MAY CONCERN:

Be it known that ISAAC A. SERGEANT, of Springfield, in the county of Clark, and State of Ohio, invented certain new and useful improvements in Clothes-Wringers; and I do hereby declare the following to be a full, clear, and exact description of the same, reference being had to the accompanying drawings, making part of this specification, in which—

Figure 1 is a rear perspective view of the machine as in operation.

Figures 2 and 3 are, respectively, a horizontal and vertical section through the part by which the machine is attached to the tub.

This invention consists of a machine which is readily attached to a common wash-tub, and is specially adapted to facilitate the wringing of clothes.

To enable others skilled in the art to understand the invention, the following is a description of the manner in which it is carried out; describing briefly the clamping device by which it is attached to the wash-tub, in general terms, which will form the subject of another application for Letters Patent of even date with this; and then more particularly the machine for wringing the clothes and expelling the water from them, which forms the subject of the present invention.

The wringing machine, of which this invention forms a part, as represented in the accompanying drawings, consists of a yoke, B, whose inner margin is of U form. From the lower end of the yoke B project two jaws, C C′, the latter of which contains, within a dove-tail groove, a wedge or key, D, whose exposed side is made slightly concave, as shown in fig. 2. The office of the above-described jaws and wedge is to hold the machine in position on the side of the tub A, in reference to which service they are termed, collectively, the "vise." H is a ring fitting the yoke B, and confined therein, against lateral displacement, by flanges *h h′*. I and J are a pair of jaws, the former of which is attached rigidly in front of the ring H, and is furnished on its upper edge with two ridges or lips *i i′*. The jaw J is hinged at *j* to the ring H, and is so formed, on its lower edge, as to fit between the lips *i i′*, in conjunction with which it holds the clothes tightly without danger of tearing. A latch, K, hinged at *k*, forms a guide for the jaw J, or holds it firmly and instantly in any desired position, by being forced behind a wedge-shaped hook, L. M is a spring, which retracts the latch K when liberated, such retraction being limited by a projection, N, on the jaw J. P is a pawl, which, in conjunction with notches arranged at intervals around the ring H, prevents the retrograde motion of the latter, and, in conjunction with a dog, O, holds it down within the yoke. E is an arm or frame, nearly equal in length to the diameter of a small wash-tub, and extending horizontally from the lower part of the yoke B, to either side of which it is so hinged (*e*) as to admit of being turned up to a vertical position, at the same time that it is held against depression by shoulders *f*. F is a hitching-pin or knob, rising vertically from the end of the arm E. G is a ledge, to assist in holding the clothes around the pin F, as hereafter explained.

The operation is as follows: The machine being attached to the side of the wash-tub, as represented in the drawings, and the clamp H I J K L confined within the yoke B, one end of a garment is passed through the ring H, and the jaw J being closed down upon it, the latch K is placed behind the hook L, as shown in red in fig. 1, so as to secure the parts in position. The other portion of the garment is then bent around the hitching-pin F, and held fast with the left hand, the thumb resting against the ledge G, and the clamp is rotated with the right hand, in the direction of the arrow, until the portion of the garment between the clamp and the hitching-pin is sufficiently wrung out. The jaw J being then released and elevated, the wrung portion is drawn through the clamp into a basket, and another hitch being taken, the succeeding portions are treated in like manner. This arrangement affords great facility for successively rinsing and wringing out the clothes from several waters in as many tubs, the wringer being readily changed from tub to tub. When it is desired to have free access to the tub, the arm E is folded up compactly against the clamp, so as to be entirely out of the way, by which means the operations of washing, or rinsing and wringing, may succeed each other without trouble or delay. Either the rotary clamp or the whole machine may be instantly detached, for the purpose of cleaning parts where dirt is apt to lodge—a common necessity, to avoid soiling the next batch, after dealing with colored or much soiled garments. It will be seen it is the object of the "vise" C C′ D to support the wringer in position, and neither it nor the tub is required to sustain any part of the severe tensional strain produced in wringing, such strain occurring almost wholly in the direction of the hitching-arm E, which arm is held down with more or less force, or instantly released if need be, to "humor the work," or graduate the stress on the clothing, as may be desired.

What is claimed as new, and of this invention herein, is—

1. The yoke B, provided with a suitable hitching-arm, the said yoke being adapted to be temporarily attached to a wash-tub, or readily disconnected therefrom, as explained, and employed as a bearing for a rotary clamp for wringing clothes.

2. In the described connection with the yoke B, the movable clamp H I J K L, and pawl and dog P O, by means of which the said clamp is retained within the yoke, or may be readily removed therefrom at will, to be cleansed or dried.

3. In the described connection with a rotary clamp for wringing clothes, the hinged and yielding hitching-arm E, for the purposes explained.

ANN JANE SERGEANT,
*Administratrix.*

Witnesses:
ARTHUR E. UNDERWOOD,
THOS. D. MITCHELL.